United States Patent
Oetken

(10) Patent No.: US 11,764,598 B2
(45) Date of Patent: Sep. 19, 2023

(54) ELECTRIC VEHICLE FLUID HEATING SYSTEM

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 156 days.

(21) Appl. No.: 17/349,351

(22) Filed: Jun. 16, 2021

(65) Prior Publication Data

US 2022/0407327 A1    Dec. 22, 2022

(51) Int. Cl.
*H02J 7/00*    (2006.01)
*B60L 58/12*   (2019.01)
*F15B 21/042*  (2019.01)
*B60L 53/62*   (2019.01)

(52) U.S. Cl.
CPC ............ *H02J 7/0068* (2013.01); *B60L 53/62* (2019.02); *B60L 58/12* (2019.02); *F15B 21/042* (2013.01); *H02J 7/0048* (2020.01); *B60L 2200/40* (2013.01)

(58) Field of Classification Search
CPC ....... H02J 7/0068; H02J 7/0048; B60L 53/62; B60L 58/12; B60L 2200/40; F15B 21/042
See application file for complete search history.

(56) References Cited

U.S. PATENT DOCUMENTS

| | | | |
|---|---|---|---|
| 8,410,401 B2 | 4/2013 | Thomas et al. | |
| 10,036,288 B2 | 7/2018 | Leone et al. | |
| 10,774,919 B2 | 9/2020 | Yamazaki et al. | |
| 10,781,731 B2 | 9/2020 | Amin et al. | |
| 11,352,940 B1 * | 6/2022 | Gates | F01P 7/167 |
| 2018/0172137 A1 * | 6/2018 | Yamazaki | F16H 57/0483 |
| 2019/0001954 A1 * | 1/2019 | Ali | F28D 20/02 |

FOREIGN PATENT DOCUMENTS

| | | |
|---|---|---|
| GB | 2508262 | 5/2014 |
| WO | 2009065474 | 5/2009 |

* cited by examiner

*Primary Examiner* — Jared Fureman
*Assistant Examiner* — Duc M Pham
(74) *Attorney, Agent, or Firm* — Schwegman, Lundberg & Woessner

(57) ABSTRACT

A fluid heating system for an electric work machine powered by a battery may include a fluid heater arranged and configured to heat fluid on the work machine and a control module configured to control fluid heating operations by controlling power to the fluid heater based on active operation of a battery charging unit.

20 Claims, 5 Drawing Sheets

ELECTRIC VEHICLE FLUID HEATING SYSTEM

TECHNICAL FIELD

The present application relates generally to equipment heating. More particularly, the present application relates to systems and methods for heating fluid or other systems on a vehicle or work machine. Still more particularly, the present application relates to systems and methods for heating hydraulic oil on an electrically powered work machine.

BACKGROUND

In cold weather climates, desert climates, or other weather changing conditions, work machines can get cold when they are not in use. That is, when a machine is in use, heat may be generated by the work machine. For example, heat may be generated by onboard engines, motors, pumps, heaters, or other operations. However, once the work machine is shutdown, that heat may dissipate into the surrounding environment and particular elements of the work machine may cool down in particular, hydraulic systems and the hydraulic oil relied on by the hydraulic systems may get cold.

Cold machines or equipment may not function as desired. For example, cold hydraulic oil may negatively impact responsiveness and efficiency of the hydraulically operated components of a work machine. Moreover, operation of hydraulic systems in a cold state may require higher energy inputs than the energy inputs required in a warmer or hot state.

International patent application WO2009065474 relates to a method for heating a fluid a motor vehicle. A charging state of an accumulator for electrical energy is determined before a start of an internal combustion engine. An energy proportion which is available for heating the fluid is determined in a subsequent step from the charging state of the accumulator. In a further subsequent step, the fluid is heated with a maximum of said energy proportion by means of an electrical heating element.

SUMMARY

In one or more embodiments, a fluid heating system for an electric work machine powered by a battery may include a fluid heater arranged and configured to heat fluid on the work machine. The fluid heating system may also include a control module configured to control fluid heating operations by controlling power to the fluid heater based on active operation of a battery charging unit.

In one or more embodiments, a method for heating a fluid on an electric work machine powered by a battery may include charging the battery with a charging unit. Moreover, and so long as charging power is available, the method may also include operating a fluid heater on the work machine.

DETAILED DESCRIPTION

Figure 1:
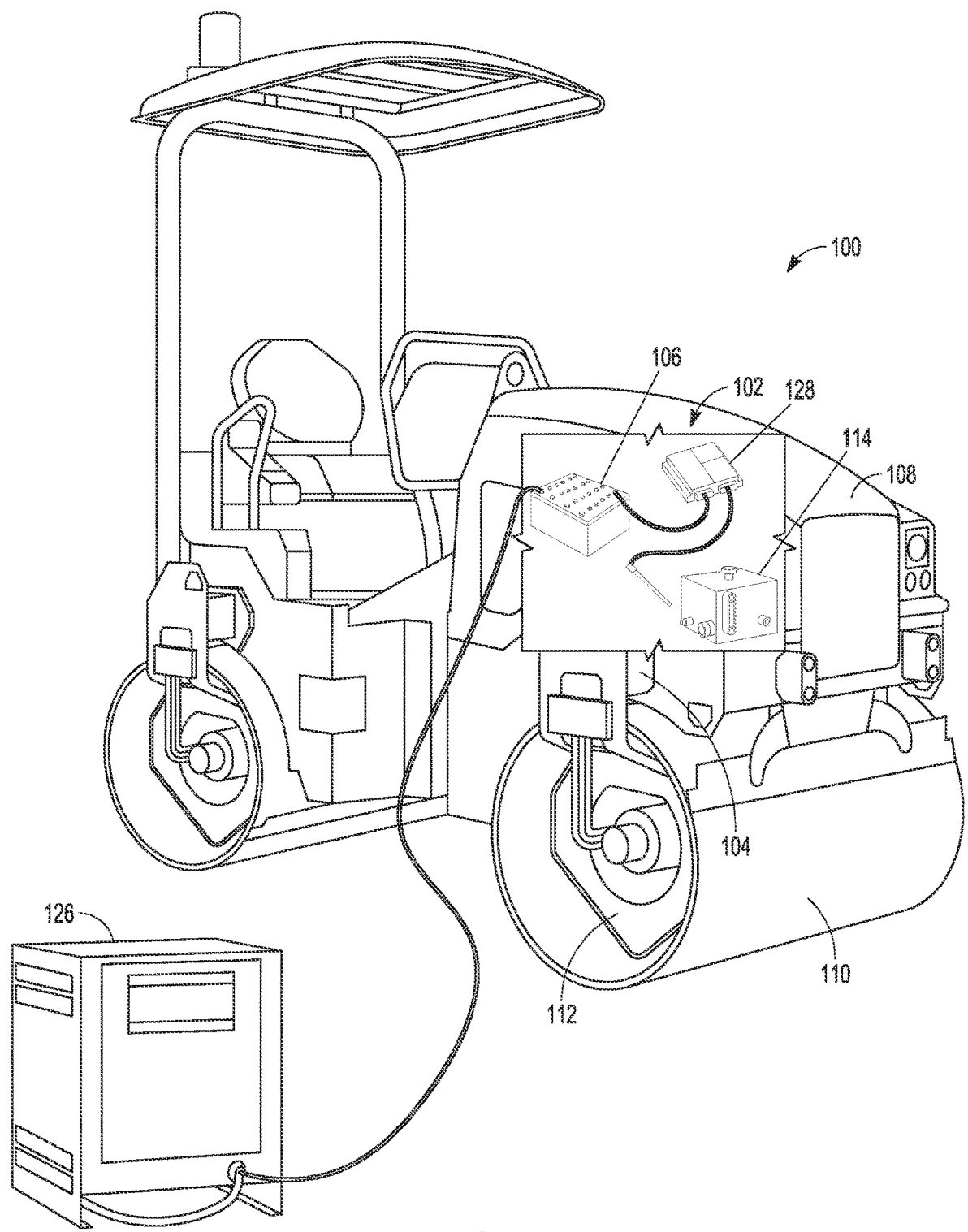
FIG. 1 is a perspective view of an electric work machine having a hydraulic system and a fluid heating system, according to one or more embodiments.

FIG. 1 is a perspective view of an electric work machine 100 having a fluid heating system 102, according to one or more embodiments. The electric work machine may be one of a variety of types of work machines. For example, and as shown, the work machine 100 may be in the form of a tandem vibratory roller. The work machine 100 may be adapted for mobility and for performing work. For example, in the case of a tandem vibratory roller, the work machine 100 may be adapted for placement on semi-compacted asphalt and for bringing the asphalt to a fully compacted state. The work machine 100 may operate to roll across the semi-compacted asphalt and induce vibration in the asphalt in addition to providing an external compressive load on the asphalt causing the asphalt to compact. Whether in the form of a tandem vibratory roller or another type of work machine 100, the work machine 100 may include a frame 104, a power source 106, a motor 108, a ground engaging traction system 110 operable by the motor via a control module, a work implement 112 operable by the motor (directly or indirectly). That is, while a tandem vibratory compactor has been shown, still other work machines may be provided. For example, other types of compactors, an asphalt paver, a cold planer, excavator, or another type of work machine may be provided.

With continued reference to FIG. 1, the work machine frame 104 may establish a structure for supporting the remaining aspects of the work machine. The frame 104 may extend across the top and/or be supported by the traction system 110 via a suspension system. The frame 104 may include a series of structural elements sized and shaped to receive equipment loads and transfer those loads to the ground engaging traction system. The structural elements may be structural steel, steel, steel alloy, aluminum, composite, or another relatively strong material adapted to bridge across a network of support points provided by the ground engaging traction system and/or suspension system thereof.

The power source 106 may be arranged on the frame and adapted to store energy and provide power to the work machine. In one or more embodiments, the power source may be in the form of a battery, a fuel tank, or another type of energy storing material. Depending on the nature of the power source, the power source may be in electrical and/or fluid communication with the motor.

The work machine motor 108 may be arranged on the frame and may be adapted to provide motive power to the work machine by converting energy from the power source to motion. In particular, the motor 108 may be an electric motor adapted to generate rotational power when placed in electrical communication with a battery. The motor may be mechanically coupled to the traction system such that rotation of the motor provides rotational power to the traction system 110.

The traction system 110 may be operable to translate the work machine across the ground or other supporting surface. That is, the traction system 110 may be in the form of wheels, rollers, tracks, or other system that, when rotated or provided with rotational power, causes the work machine to translate across the ground or supporting surface. It is to be appreciated that while rotational power has been described, skid feet or other types of traction system may be provided as well.

The work machine may also include a work implement 112. In the case of a tandem vibratory compactor, the work implement may be incorporated into the traction system 110 and may function to augment the traction system 110. That is, the tandem vibratory compactor may have particularly adapted rollers that not only allow for translation of the work machine 100, but also provide a vibratory and compaction effect on the supporting ground surface. In other embodiments, the work implement may be isolated from the traction system such as in the case of a cold planer, excavator, or other implement that may have a separate device for working the ground.

Figure 2:
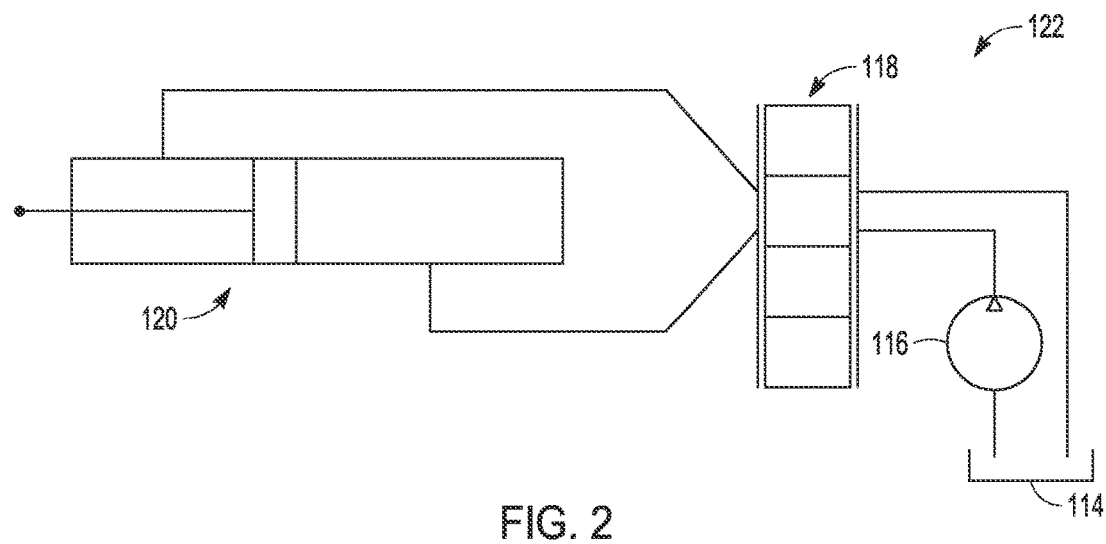
FIG. 2 is a schematic view of the hydraulic system of the work machine of FIG. 1, according to one or more embodiments.

In any of the above cases, the work implement 112 may include a hydraulic system 122 for operating the implement. As shown in FIG. 2, the hydraulic system may include a fluid storage tank 114, a pump 116, an operating valve 118, and a hydraulic tool 120. The fluid storage tank 114 may store hydraulic fluid for the hydraulic system 122 and may maintain the fluid at atmospheric or near atmospheric pressure. The storage tank 114 may include supply lines and return lines extending to/from the hydraulic tool 120 allowing fluid to be pumped into the hydraulic tool 120 by the pump 116 and to return to the tank 114. The fluid storage tank 114 may include a heater 124 (shown in FIGS. 3-6) and, as such, may be part of the fluid heating system 102. In one or more embodiments, the heater 124 may include an electric heater. For example, the electric heater 124 may be adapted to convert electricity to heat via a resistance element and may be an electrically resistive heater. In one or more embodiments, the electrical power sent to the heater may include a relatively low voltage and high amperage power suitable for generating heat. The hydraulic system 122 may also include a pump 116 for drawing fluid from the tank 114 at low pressure and energizing the system with flowing fluid. As the flowing fluid enters the system and encounters flow resistance, hydraulic pressure may develop in the system 122. The hydraulic system may also include an operating valve 118 for selectively and controllably directing the fluid flow to and from the hydraulic tool 120. For example, the operating valve 118 may direct fluid to a cap end of a hydraulic cylinder when extending the hydraulic cylinder while also receiving fluid from the rod end and allowing that fluid to return to the tank 114. Opposite flows may be provided when retracting the cylinder, for example. The hydraulic tool 120 may be in the form of a hydraulic cylinder as described or other types of hydraulic tools may be provided. For example, in the case of a vibratory compactor, the hydraulic tool may be, for example, a rotary vibrator within a roller drum of the compactor. Still other types of hydraulic tools 120 may be provided.

Figure 3:
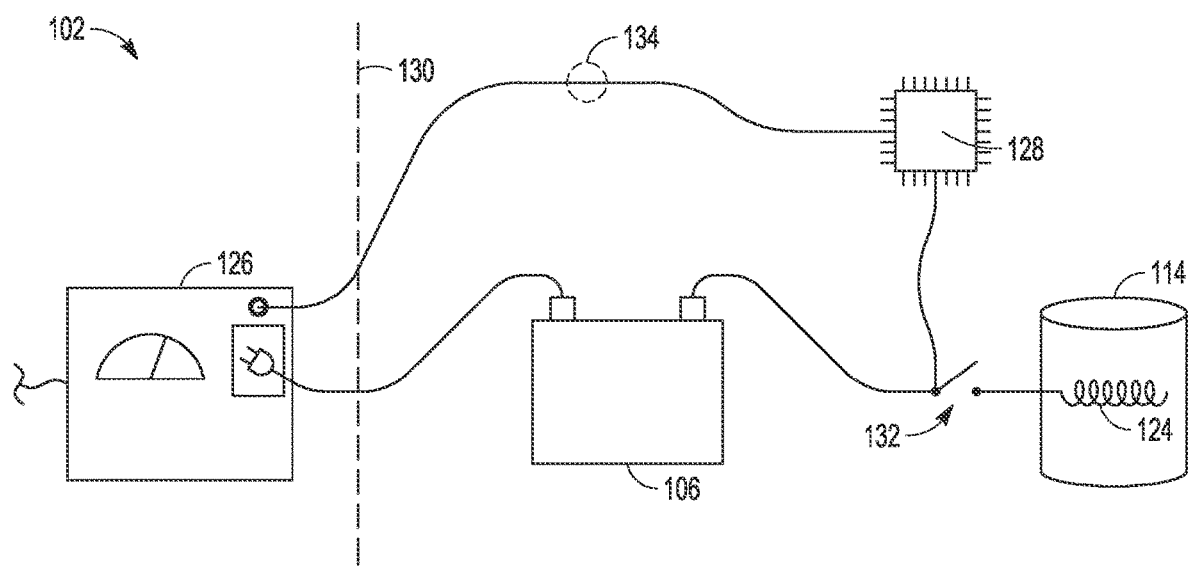
FIG. 3 is a schematic view of the fluid heating system of FIG. 1, according to one or more embodiments.

Within this environment, a fluid heating system 102 may be provided. That is, as mentioned, where cold or cool hydraulic fluid is present, the hydraulic system may not function as intended or it may function with less responsiveness or efficiency. As such, the fluid heating system 102 may be provided and may be adapted to heat the hydraulic fluid in the system prior to use. As shown in FIG. 3, the fluid heating system may include a charging unit 126, a battery 106, a control module 128, and a fluid tank 114 with a heater 124.

The charging unit 126 may be adapted to receive power from a power source such as electrical grid power, a generator, or another source of electrical power and deliver the power to the battery 106 in a controlled manner. For example, the charging unit 126 may receive alternating current (AC) power from the power source and may convert the AC power to direct current (DC) power. Still further, the charging unit 126 may deliver the DC power at a rate that is suitable for the battery 106 based on battery chemistry, the desired charging rate, and a variety of other factors. The charging unit 126 may, thus, include a case having a supply line extending therefrom for connecting to the power source. The supply line may include a plug or a hard wired connection may be provided. The case may contain an inverter, a power transformer, a voltage regulator, a variable resistor, a voltmeter, an ammeter, and a user interface for adjusting and/or controlling the output of the charging unit. Still other features of the charging unit may be provided.

Depending on the nature of the charging, the size and sophistication of the work machine 100, the battery size, battery chemistry, and/or other factors, the charging unit 126 may be located at a charging station off of the work machine, as shown, or the charging unit may he arranged on the frame or otherwise be part of the work machine. For example, where the work machine is a large piece of equipment having a relatively large battery, the charging unit may be located off of the machine because the charging unit for a large battery may also be relatively large. In this circumstance, the charging unit 126 may be a mobile unit such as a charging unit on a dolly, truck trailer, or the like, or the charging unit 126 may be a stationary unit where work machines are driven or carried to the charging unit 126. However, where the work machine is relatively small and has a relatively small battery, the charging unit may be located on the work machine. In this circumstance, the charging unit may include a supply line having a plug and the work machine may be driven to a location at or near an electrical outlet where it may be plugged in, for example.

The battery 106 may be configured to provide electrical power to the work machine. The battery may include two or more terminals such as a positive terminal and a negative terminal, each in electrical communication with respective electrodes surrounded by an electrolyte solution. The battery may be adapted to generate an electric current from one terminal to another terminal when the two terminals are connected with a circuit. The electricity flowing through the circuit may be used to power particular devices arranged along the circuit such as the motor 108 of the work machine, for example. In one or more embodiments, and depending on the configuration of the fluid heating system 102 as discussed in more detail below, the electricity flowing through the circuit may be used to power the fluid heater 124.

The control module 128 may be an electronic control module. The control module 128 of the fluid heating system 102 may be adapted to control the way the power delivered by the charging unit 126 is used. That is, the control module 128 may be adapted to prioritize and/or use the power from the charging unit 126 for particular items before using the power for other items. In one or more embodiments, for example, the control module 128 may prioritize battery charging over fluid heating. That is, the control module 128 may direct charging power to the battery 106 unless or until the battery reaches a threshold state of charge and only after reaching the threshold state of charge may the control module 128 direct charging power to the fluid heater 124. At that point, and depending on the configuration of the system, the control module 128 may interrupt power flowing to the battery 106 from the charging unit 126 to the battery 106 and direct it to the fluid heater 124. Alternatively, the control module 128 may draw battery power from the battery 106 to drive the fluid healer 124, but may control the amount of battery charge used for this purpose and/or prevent this type of operation when the charging unit 126 is not operating to maintain the battery 106 at the threshold charge state.

The control module 128 may, thus, include inputs or sensors providing the control module 128 with the ability to monitor the state of charge of the battery 106 and outputs or controllers providing the control module 128 with the ability to control the flow of power in the system. That is, in one or more embodiments, the inputs may include data inputs that are in communication with a computing device incorporated into the battery 106 (e.g., where a smart battery is provided) or data inputs that are in communication with state of charge readings on the charging unit 126, for example. In other embodiments, the inputs may include electrodes in electrical communication with the terminals on the battery and the voltage differential on the battery may be used by the control module 128 to assess the state of charge of the battery 106. With respect to outputs, the outputs may include switches, filters, or other electrical control components that may fully direct the electrical power flowing to one or more elements or controllably direct electrical power to one or more locations. Where electrical power is controllably directed to one or more locations, the output elements may be configured to control how much electrical power goes to each location. For example, where a trickle charge to the battery 106 is desired even after reaching its threshold charge state, the output on the control module may maintain trickle charge to the battery 106 while directing the remaining power to the fluid heater 124. Still further, and depending on the configuration of the system, directing electrical power may include "drawing" power from the battery 106 to run the heater 124 or "redirecting" charging power to run the heater.

The control module 128 may also include a processor for analyzing the inputs and making decisions on how to operate the controllers, for example. Depending on the configuration of the system and resulting nature of the inputs, the processor may be more sophisticated or less sophisticated. That is, where the inputs provide the state of charge of the battery 106, the processor may be limited comparing the state of charge to a threshold and responsively controlling the outputs. However, where the inputs are more basic, such as the voltage differential between the terminals, the processor may be more sophisticated and have the ability to establish the state of charge based on the inputs, compare the state of charge to a threshold, and con the outputs.

The control module 128 may also include a timer or clock, for example. That is, the control module 128 may be adapted to control when the fluid heating system operates to heat the fluid in the hydraulic system. For example, the control module may be adapted to heat fluid just prior to operation times. Where a work machine charges overnight, the control module 128 may be adapted to wait until the early morning hours (e.g., 6:00 am) to operate the heater 124 such that the fluid is heated just prior to commencement of work operations (e.g., 7:00 am). The amount of time prior to commencement of work that is used to heat the fluid may be called a heating window. In one or more embodiments, the control module 128 may include a storage medium and the control module may keep track and/or store information about the fluid heating rate and ambient temperature and may develop an ongoing log of how long it takes to bring the fluid up to suitable operating temperature under particular environmental conditions and, as such, the system may learn appropriate heating windows. The control module 128 may also store start up times and, as such, may trigger heating operations based on known or anticipated start up times and known or anticipated heating windows. For example, if startup times are commonly at 7:00 am and fluid heating commonly takes 30 minutes under current conditions, then heating may begin at 6:30. Buffers for unusual circumstances may also be built, For example, with a heating window of 30 minutes and a start time of 7:00 am, the heater may be turned on at 6:15 am, providing a 15 minute buffer. In still other embodiments, the control module 128 may allow for particular heating times to be set or selected. Moreover, particular heating temperatures may also be set or selected. Sensors allowing the control module 128 to understand the heating times, fluid temperatures, ambient temperatures, or other relevant values may also be provided.

The control module 128 may include a user interface on the work machine for setting up the control module. That is, the interface may include input options for inputting the threshold state of charge and the timing information. For example, the interface may allow a user to define a heating start time, a work start time, a heating window, a buffer, or other times or timeframes. Still other inputs may be made available to the user.

It is to be appreciated that the control module 128 may be a stand alone component dedicated to managing the fluid heating operations, Alternatively, the control module 128 may be a component of a control module already or otherwise present on a work machine 100 for controlling operations of the work machine 100. Still further, the control module 128 may be a component of an auxiliary control module of a work machine 100. In one or more embodiments, the control module 128 may include some components on one control module and additional components on another control module where the several components work together to control the fluid heating operations.

The fluid tank 114 with a heater 124 has been described with respect to the hydraulic system above.

With the several components described, the various configurations of the components may be discussed in more detail. That is, as shown in FIGS. 3-6, various configurations may he provided. FIG. 3 shows a first embodiment, having a charging unit 126 arranged off of a machine 100 (as shown by the machine boundary 130) and the battery 106, control module 128, and heater 124 located on the machine 100. The charging unit 126 may be a mobile or stationary unit and may hardwired to a power source or a plug, multiple plugs, or another connection interface may be provided. Moreover, in this embodiment, the control module 128 may interface with the battery 106 and the heater 124 at a location downstream of the battery 104 and a direct connection between the charging unit 126 and the heater 124 may not be provided. In one or more embodiments, this downstream interface may include placing the control module 128 in electrical communication between the battery 106 and the heater 124. However, in other embodiments as shown, the control module may be in electrical communication with a switch or other device 132 that is placed in electrical communication between the battery 106 and the heater 124. As shown, the connection between the charging unit 126 and the work machine 100 may include a plug adapted for plugging into an outlet on the charging unit 126, for example.

In this embodiment, charging of the batter 106 may be performed by the charging unit 126 and the control module 128 may monitor the charging process. Due to the downstream arrangement of the heater 124 from the battery 106, the control module 128 may be configured to determine when to "draw" power from the battery 106 to run the fluid heater 124. This determination may be based on one or more factors.

First, the control module 128 may assess whether the battery 106 has been charged to a sufficient state of charge. In one or more embodiments, the sufficient state of charge may be 100% charged, or, a state of charge of 80% may be used. In still other embodiments and depending on other factors relating to work demands, the control module 128 may determine that a sufficient state of charge is less than 80% and may allow for fluid heating with a state of charge of 50% or 60%, for example. Still other states of charge may be used to trigger fluid heating. The control module 128 may receive a state of charge input from the battery 106 where the battery is equipped with monitoring equipment (e.g., smart battery) or the control module 128 may assess the state of charge of the battery by monitoring the voltage differential across the battery terminals, for example. In one or more embodiments, a communication line 134 from the charging unit 126 may be included to allow the state of charge of the battery 106 to be received by the control module 128 from the charging unit 126.

Second, the control module 128 may determine when timing is appropriate to heat the fluid. That is, for example, where a work machine 100 is charging overnight, the battery 106 may reach the threshold state of charge in the middle of the night, for example. In this circumstance, the control module 128 might not direct battery power to heat the fluid because work operations will not begin for several more hours. However, upon reaching a time that falls within a heating window, the control module 128 may begin to draw power from the battery 106 to run the heater 124 and heat the fluid. This may involve triggering the switch 132 and placing the battery 106 in electrical communication with the heater 124. In one or more embodiments, particular switches or electrical components may be used to control how much and/or how fast electrical power is drawn from the battery.

Third, even where the battery 106 has reached a sufficient state of charge and a time has occurred that falls within a heating window, the control module 128 may avoid operating the fluid heater 124 if the charging unit 126 is no longer connected or is not operational. That is, the control module 128 may protect against using battery power to run the fluid heater 124 unless the battery power is going to be readily and/or immediately replenished. In one or more embodiments a communication line 134 from the charging unit 126 to the control module 128 may be provided so the control module 128 may receive an input relating to operation of the charging unit 126. In other embodiments, the control module 128 may, instead, use the state of charge of the battery 106 as a proxy for determining whether the charging unit 126 is connected and operational. That is, the control module may monitor changes to the state of charge of the battery 106 and if operating the fluid heater 124 alters the state of charge of the battery too much (e.g., more than it would if the battery was being charged), then the control module 128 may interrupt fluid heating. In one or more embodiments, this approach may involve interrupting fluid heating when the state of charge of the battery drops below the threshold state of charge by a particular amount or percentage. For example, the control module 128 may use battery power to run the heater unless until the state of charge of the battery drops below the threshold state by 10%, for example.

Figure 4:
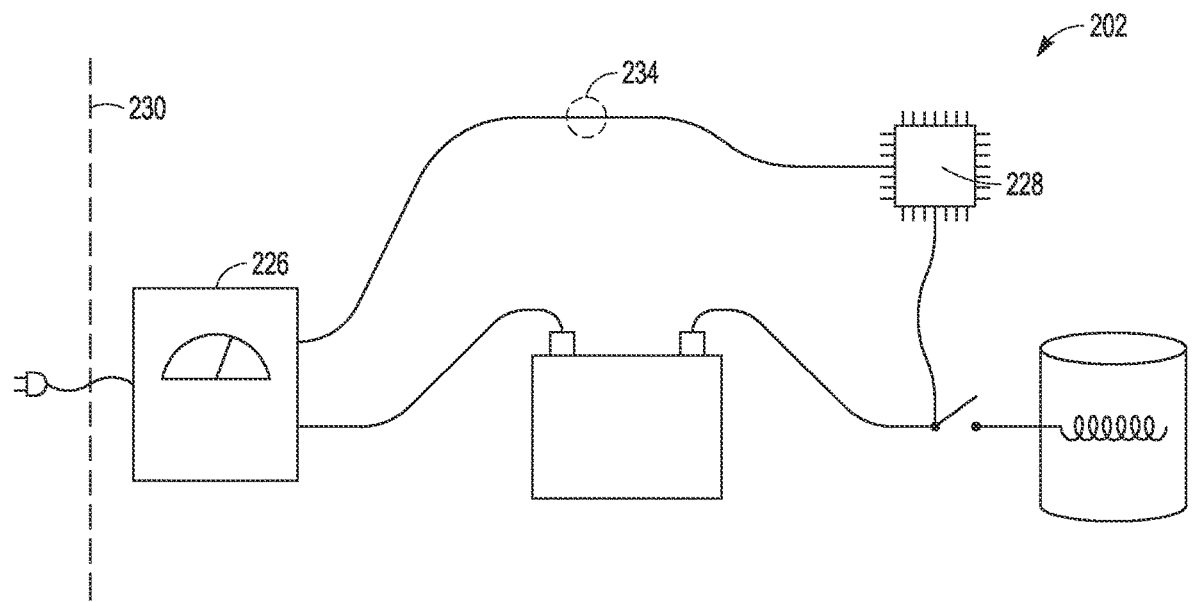
FIG. 4 is a schematic view of another fluid heating system, according to one or more embodiments.

Turning now to FIG. 4, another embodiment of a fluid heating system 202 is shown. This embodiment is the same or similar to the embodiment of FIG. 3, except the charging unit 226 is located on the work machine (e.g., within the work machine boundary 230). In this embodiment, communication lines 234 between the charging unit 226 and the control module 228 may be more feasible and, as such, the communication lines mentioned with respect to FIG. 3 for providing state of charge information and/or charging unit operation information may be more readily available. The fluid heating system may include a power cord extending from the charging unit 226 and may include a plug for plugging the fluid heating system into an outlet, for example, such that the work machine may be free to operate by unplugging the machine and such that the machine may return to a location near an outlet for charging after operations are complete or battery charge is depleted.

Figure 5:
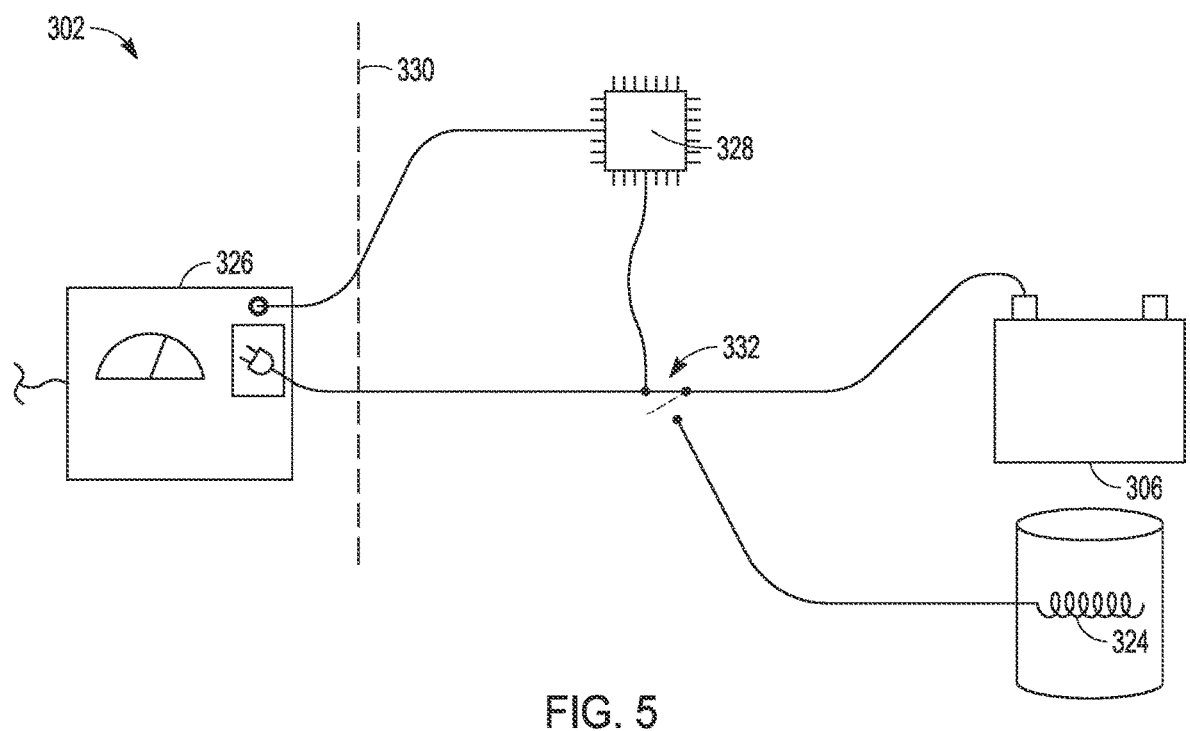
FIG. 5 is a schematic view of another fluid heating system, according to one or more embodiments.

Turning now to FIG. 5, another embodiment of a fluid heating system 302 is shown. As shown, this embodiment is similar to that of FIG. 3 where a charging unit 326 is arranged off of the work machine (e.g., outside the machine boundary 330) and the battery 306, control module 328, and heater 324 are located on the machine. Like FIG. 3, the charging unit 326 may be a mobile or stationary unit and may hardwired to a power source or a plug, multiple plugs, or another connection interface may be provided. However, unlike FIG. 3, the control module 328 in this embodiment may interface with the battery 306 and the charging unit 326 at a location upstream of the battery 306 and a direct connection between the charging unit 326 and the heater 324 may be provided. In one or more embodiments, this upstream interface may include placing the control module 328 itself in electrical communication between the battery 306 and the charging unit 326. However, in other embodiments as shown, the control module 328 may be in electrical communication with a switch or other device 332 that is placed in electrical communication between the battery 306 and the charging unit 326. As shown, the connection between the charging unit 326 and the work machine may include a plug adapted for plugging into an outlet on the charging unit 326, for example.

In this embodiment, charging of the battery 306 may be performed by the charging unit 326 and the control module 328 may monitor the charging process. With this arrangement of devices (e.g., charging unit, battery, and heater in a branched configuration), the control module 328 may be configured to determine when to divert power from the battery 306 to run the fluid heater 324. That is, rather than determining when to "draw" power from the battery, the control module interface in this arrangement may be able to "divert" or "redirect" charging power to run the heater 324 without drawing it from the battery 306. The determination on whether to divert power to the heater 324 may be the same or similar to the determination described with respect to drawing power from the battery 306. That is, the control module 328 may wait for a threshold state of charge to be reached, it may wait in time for a heating window to arrive, and it may only run the heater 324 when the charging unit 326 is operational. In this embodiment, however, safeguards against excessively drawing battery power to run the heater 324 may be avoided because the control module 328 may not be in position to draw battery power for heating fluid. As such, if the charging unit is not operational, power will simply not flow to the battery 306 or the heater 324 at all.

Figure 6:
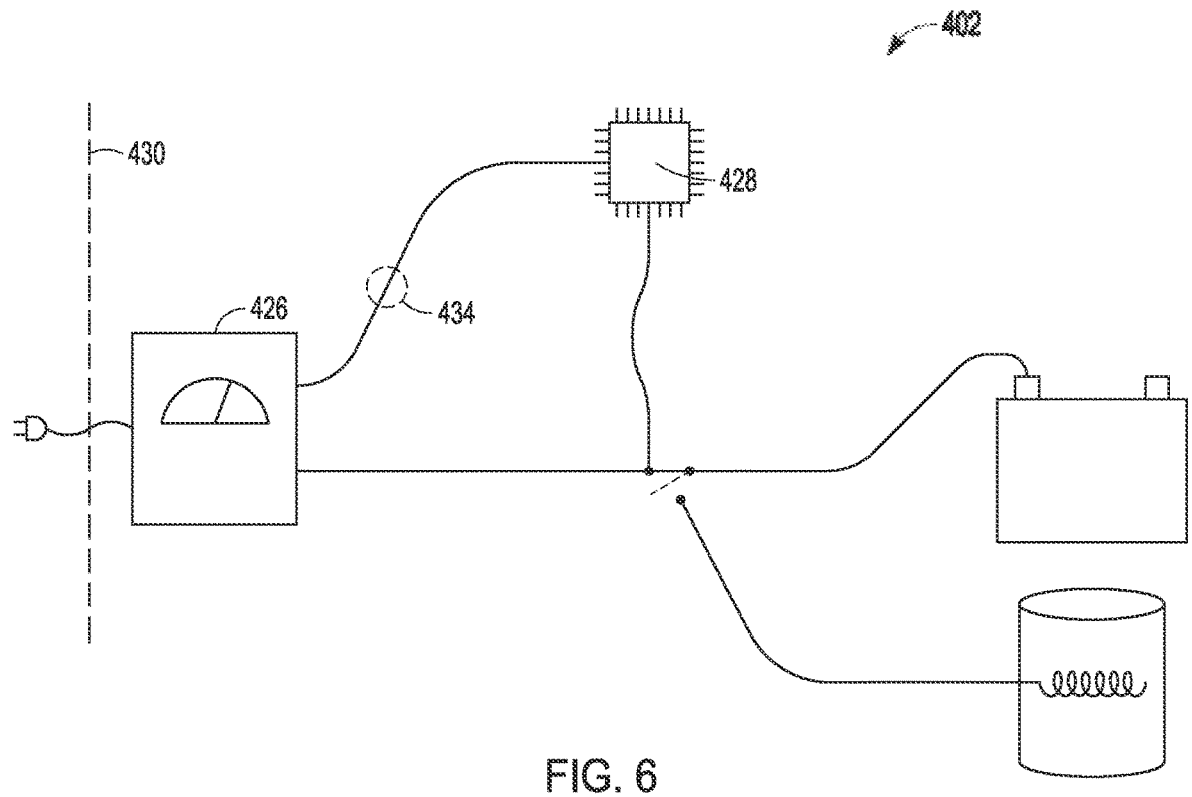
FIG. 6 is a schematic view of another fluid heating system, according to one or more embodiments.
Figure 7:
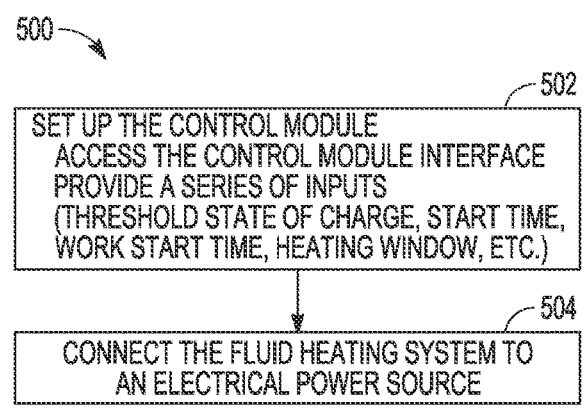
FIG. 7 is a diagram depicting a method of preparation of a work machine, according to one or more embodiments.
Figure 8:
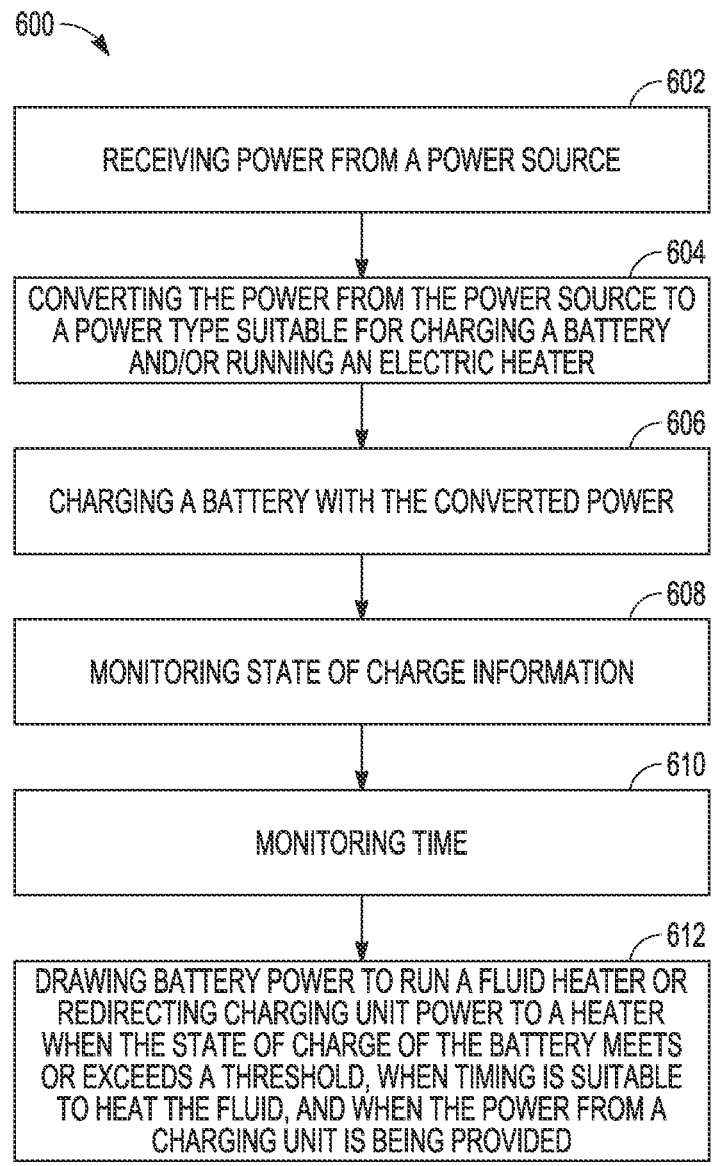
FIG. 8 is a diagram depicting a method of fluid heating, according to one or more embodiments.

FIG. 6 shows yet another configuration of the fluid heating system 402. This embodiment may the same or similar to the embodiment of FIG. 5, except the charging unit 426 in this embodiment may be arranged on the work machine (as evidenced by being outside the machine boundary 430). Like the embodiment of FIG. 4, communication lines 434 between the charging unit 426 and the control module 428 may be more feasible and, as such, the communication lines mentioned with respect to FIG. 3 for providing state of charge information and/or charging unit operation information may be more readily available. The fluid heating system 402 may include a power cord extending from the charging unit 426 and may include a plug for plugging the fluid heating system 402 into an outlet, for example, such that the work machine may be free to operate by unplugging the machine and such that the machine may return to a location near an outlet for charging after operations are complete or battery charge is depleted.

It is to be appreciated that while a hydraulic fluid or oil heating system has been provided, the system may be used to heat other aspects of the work machine as well. For example, brake fluid heating, in-cab heating, engine block heating, or other heating operations may be provided. Still further, while the fluid heating system has been said to include the charging unit, the battery, the control module, and the heater, one of these components or various combinations of these components may constitute a fluid heating system.

INDUSTRIAL APPLICABILITY

In operation and use, a user may perform a method of preparation (500). That is, a user may use the above-described system to prepare for an upcoming day of work operations, an upcoming project, an upcoming season, or another range of work machine use. In this method, the user may interact with the control module to set up the control module (502). For example, a user may access the control module interface and provide a series of inputs. For example, the user may input the threshold state of charge such that the control module will avoid running fluid heating operations unless/until the batter reaches the threshold state of charge. The user may also input a heating start time, a work start time, a heating window, or another time or time frame. The user may also connect the fluid heating system to a electrical power source (504). This may include plugging the machine into a power outlet or plugging the machine into an off-machine charging unit.

The system may also perform a method of fluid heating (600). The method of fluid heating may include receiving power from a power source (602). The method may also include converting the power from the power source to a power type suitable for charging battery and/or running an electric heater (604). In one or more embodiments, this converting may include converting AC power to DC power and regulating the voltage to 12 volts, for example. The method may also include charging a battery with the converted power (606). The method may also include monitoring the charging with a control module (608). The control module may monitor the charging by receiving state of charge information from the charging unit or from the battery and/or establishing the state of charge of the battery based on a voltage differential of the battery terminals. Monitoring the charging may also include continually or periodically comparing the state of charge of the battery to threshold state of charge. The method may also include monitoring time with the control module (610). Monitoring time may include monitoring the time of day. Monitoring time may also include monitoring the time between the current time and the start of work operations to determine if a heating window has arrived. In still other embodiments, monitoring the time may include monitoring the amount of time it takes to bring the hydraulic fluid to an operating temperature and storing the amount of time in conjunction with ambient temperature data. The method may also include monitoring the presence and operation of a charging unit. That is, where the control module interfaces with the fluid heating system downstream of the battery, the control module may receive information from the charging unit directly regarding whether it is still connected and charging or the control module may use the state of charge of the battery as a proxy for whether the charging unit is still connected and charging. The method may also include drawing battery power to run a fluid heater or redirecting charging unit power to a heater when the state of charge of the battery meets or exceeds a threshold, when timing is suitable to heat the fluid, and when the power from a charging unit is being provided (612).

The above detailed description is intended to be illustrative, and not restrictive. The scope of the disclosure should, therefore, be determined with references to the appended claims, along with the full scope of equivalents to which such claims are entitled.

What is claimed is:

1. A fluid heating system for an electric work machine powered by a battery, comprising:
    a fluid heater arranged and configured to heat fluid on the work machine; and
    a control module configured to control fluid heating operations by:
        monitoring a state of charge of the battery during charging operations and comparing the state of charge to a threshold state of charge; and
        if the state of charge of the battery meets or exceeds the threshold state of charge and charging power continues to be available, then directing power to a fluid heater on the electric work machine.

2. The fluid heating system of claim 1, wherein directing power to the fluid heater is further based on time.

3. (Otiginal) The system of claim 2, wherein the threshold state of charge of the battery is 80%.

4. The system of claim 2, wherein directing power to the fluid heater based on the time comprises comparing the time to a heating window.

5. The system of claim 1, wherein the control module interfaces with the fluid heating system downstream of the battery.

6. The system of claim 5, wherein directing power to the fluid heater comprises actuating a switch to draw power from the battery to operate the fluid heater.

7. The system of claim 5, wherein directing power to the fluid heater based on active operation of a battery charging unit is based on fluctuations of the state of charge of the battery.

8. The system of claim 5, wherein directing power to the fluid heater based on active operation of a battery charging unit is based on communications from the battery charging unit to the control module.

9. The system of claim 1, wherein the control module interfaces with the fluid heating system upstream of the battery.

10. The system of claim 9, wherein directing power to the fluid heater comprises actuating a switch to divert power from a charging unit to operate the fluid heater.

11. The system of claim 9, wherein directing power to the fluid heater based on active operation of a battery charging unit comprises a direct connection between the charging unit and the fluid heater where the fluid heater does not operate without power from the charging unit.

12. The fluid heating system of claim 1, further comprising the battery.

13. The fluid heating system of claim 12, further comprising a charging unit.

14. The fluid heating system of claim 13, wherein the charging unit is arranged on the electric work machine.

15. The fluid heating system of claim 13, wherein the charging unit is arranged off of the electric work machine.

16. A method for heating a fluid on an electric work machine powered by a battery, the method comprising:
  charging the battery with a charging unit;
  monitoring a state of charge of the battery during charging operations and comparing the state of charge to a threshold state of charge; and
  if the state of charge of the battery meets or exceeds the threshold state of charge and so long as charging power continues to be available, then directing power to a fluid heater on the electric work machine.

17. The method of claim 16. further comprising:
  monitoring a time during charging operations; and
  if:
  the state of charge of the battery meets or exceeds the threshold state of charge;
  the time is suitable; and
  charging power continues to be available, then:
    directing power to a fluid heater on the electric work machine.

18. The method of claim 17, wherein the time is suitable when a schedule time has arrived.

19. The method of claim 17, wherein directing power to a fluid heater comprises drawing power from the battery to operate the fluid heater.

20. The method of claim 17, wherein directing power to a fluid heater comprises diverting power from the battery to operate the fluid heater.

* * * * *